United States Patent [19]
Williams et al.

[11] Patent Number: 5,534,763
[45] Date of Patent: Jul. 9, 1996

[54] METHODS OF AND/OR APPARATUS FOR ELECTRONICALLY COMMUTATED MOTOR CONTROL

[75] Inventors: John J. A. Williams; Christian J. W. Gianni, both of Auckland, New Zealand

[73] Assignee: Fisher & Paykel Limited, Auckland, New Zealand

[21] Appl. No.: 810,382

[22] Filed: Dec. 19, 1991

[30] Foreign Application Priority Data

Dec. 19, 1990 [NZ] New Zealand ............... 236542

[51] Int. Cl.⁶ .................................................. H02P 5/06
[52] U.S. Cl. ........................ 318/799; 318/254; 318/439; 388/806
[58] Field of Search ................ 318/138, 798, 318/254, 439, 800, 811, 599, 813, 258, 434, 802, 808, 732, 799; 388/806, 815, 902, 917

[56] References Cited

U.S. PATENT DOCUMENTS

| | | | |
|---|---|---|---|
| 3,649,897 | 3/1972 | Messick | 318/434 |
| 3,887,852 | 6/1975 | Fernandes et al. | 318/732 |
| 4,250,435 | 2/1981 | Alley et al. | 318/138 |
| 4,329,630 | 5/1982 | Park | 318/258 |
| 4,447,771 | 5/1984 | Whited | 318/254 |
| 4,488,101 | 12/1984 | Studtmann | 318/800 |
| 4,490,661 | 12/1984 | Brown et al. | 318/254 |
| 4,528,485 | 7/1985 | Boyd, Jr. | 318/138 |
| 4,546,293 | 10/1985 | Peterson et al. | 318/138 |
| 4,549,122 | 10/1985 | Berkopec et al. | 388/806 |
| 4,651,069 | 3/1987 | Pellegrini | 318/254 |
| 4,686,436 | 8/1987 | Archer | 318/138 |
| 4,746,844 | 5/1988 | MacKelvie et al. | 318/254 |
| 4,757,241 | 7/1988 | Young | 318/254 |
| 4,857,814 | 8/1989 | Duncan | 318/254 |
| 4,969,756 | 11/1990 | Villec et al. | 388/815 |
| 5,272,429 | 12/1993 | Lipo et al. | 318/802 |

*Primary Examiner*—John W. Cabeca
*Attorney, Agent, or Firm*—Trexler, Bushnell, Giangiorgi & Blackstone, Ltd.

[57] ABSTRACT

A method of controlling the commutation of power to an electric motor back EMF sensing or Hall effect sensors is disclosed. At least part of the current waveform is sensed in at least one motor winding and is used to establish information relating to the appropriate commutation pattern required to commutate power to the motor and control motor parameters e.g. motor speed.

20 Claims, 9 Drawing Sheets

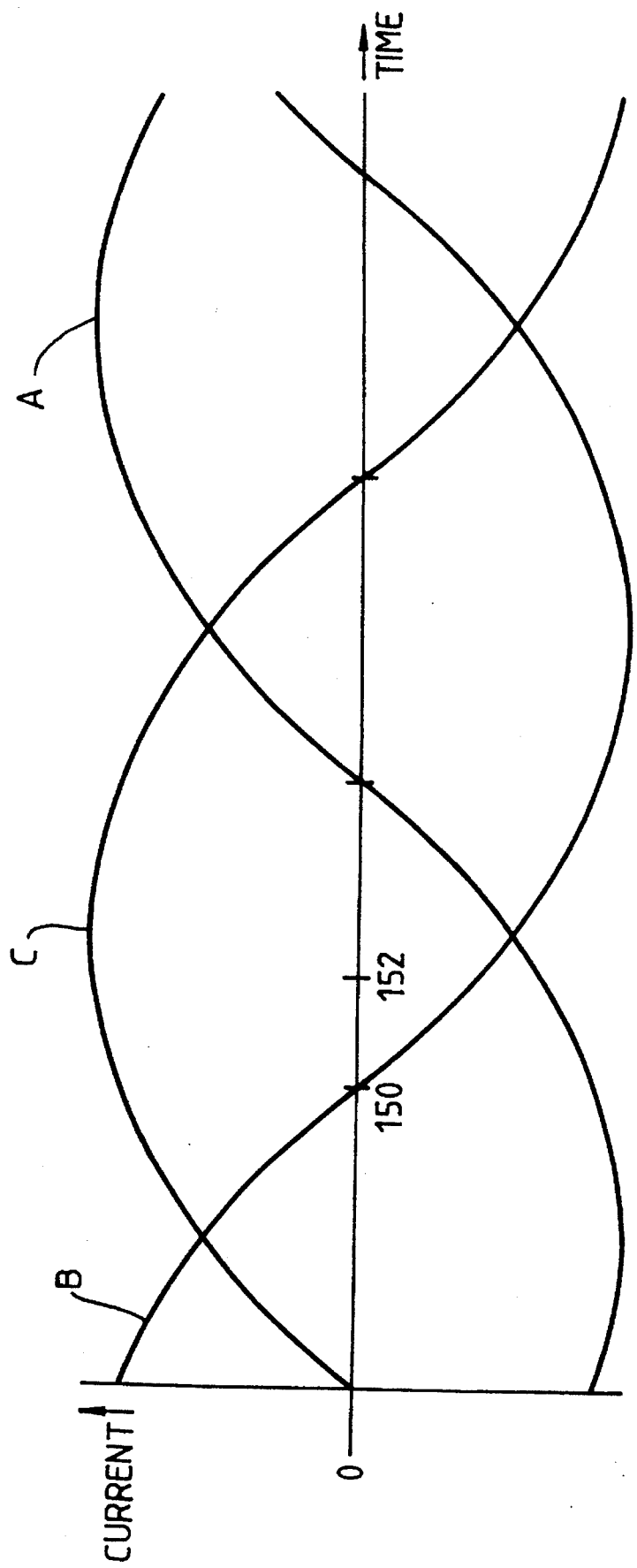

Fig. 10.

TABLE OF EXPECTED HALL PATTERNS

PATTERN # | A | B | C   ← PHASE THAT DIGITAL SIGNAL IS FROM
--- | --- | --- | ---
0 | 1 | 0 | 1
1 | 1 | 0 | 0
2 | 1 | 1 | 0
3 | 0 | 1 | 0
4 | 0 | 1 | 1
5 | 0 | 0 | 1

Fig. 12.

| OUTPUT PATTERN | PHASE A | PHASE B | PHASE C | | |
| --- | --- | --- | --- | --- | --- |
| 0 | A+ | B-(PWM) | OFF | NON-OVERLAP PATTERN | |
|   | A+ | B-(PWM) | C-(PWM) | 3 PHASE PATTERN | |
| 1 | A+(PWM) | OFF | C- | NON-OVERLAP PATTERN | |
|   | A+(PWM) | B+(PWM) | C- | 3 PHASE PATTERN | |
| 2 | OFF | B+ | C-(PWM) | NON-OVERLAP PATTERN | |
|   | A-(PWM) | B+ | C-(PWM) | 3 PHASE PATTERN | |
| 3 | A- | B+(PWM) | OFF | NON-OVERLAP PATTERN | |
|   | A- | B+(PWM) | C+(PWM) | 3 PHASE PATTERN | |
| 4 | A-(PWM) | OFF | C+ | NON-OVERLAP PATTERN | |
|   | A-(PWM) | B-(PWM) | C+ | 3 PHASE PATTERN | |
| 5 | OFF | B- | C+(PWM) | NON-OVERLAP PATTERN | |
|   | A+(PWM) | B- | C+(PWM) | 3 PHASE PATTERN | |

METHODS OF AND/OR APPARATUS FOR ELECTRONICALLY COMMUTATED MOTOR CONTROL

BACKGROUND OF THE INVENTION

This invention relates to methods of and/or apparatus for electronically commutated motor control and/or laundry machines incorporating such controls and has been devised particularly though not solely for use in electronically commutated motors (ECM) used for driving laundry machines.

It is an object of the present invention to provide methods of and/or apparatus for controlling electronically commutated motors and laundry machines incorporating such controls which will at least provide the public with a useful choice.

SUMMARY OF THE INVENTION

Accordingly in one aspect the invention consists in a method of controlling the commutation of power to an electronically commutated motor (ECM) having a rotor and a stator with a plurality of energisable windings and switching devices for connecting said windings to a power supply, using control means including commutation means to determine commutation sequences of application of voltage to at least one winding of said windings through said at least one switching device of said switching devices to cause current flow in said at least one winding, said method comprising the steps of applying voltage to said at least one winding so as to cause said current to flow in said at least one winding with a detectable wave form able to be sensed, sensing at least part of the current wave form in said at least one winding, deriving information from said current wave form at desired intervals of time and passing said information in the form of control signals to said control means and using said information to actuate said control means to control said al least one switching device to control the commutation of power to said at least one winding.

In a further aspect the invention consists in a laundry machine having a washing container, an agitator and a spin lab within said washing container, said agitator being connected so as to be rotated back and forth by an electronically commutated motor and to be rotated with said spin tub when driven continuously in one direction, said motor having a rotor and a stator with at least one energisable winding and at least one switching device for connecting said at least one winding to a power supply, using control means including commutation means to determine commutation sequences of application of voltage to said at least one winding as set forth in the preceding paragraph.

In a further aspect the invention consists in a method of controlling the commutation of power to an electronically commarated motor (ECM) having a rotor and a stator with a plurality of windings and switching means for selectively connecting said windings to a power supply, using control means including commutation means to determine commutation sequences of application of voltage to said windings with said switching means to cause current flow in at least a first of said windings, said method comprising the steps of applying voltage to a first said winding so as to cause said current to flow in said first winding with a detectable wave form able to be sensed, sensing at least part of the current wave form in said first winding, allowing a predetermined period of time to elapse after sensing said part of said current waveform and, after said predetermined time has elapsed, commutating power to a second of said winding with said commutation means.

In a still further aspect the invention consists in a method of controlling a laundry machine having a washing container, an agitator and a spin tub within said washing container, said agitator being connected so as to be rotated back and forth by an electronically commutated motor and to be rotated with said spin tub when driven continuously in one direction, said motor having a rotor and a stator with at least one energisable winding and at least one switching device for connecting said at least one winding to a power supply, using control means including commutation means to determine commutation sequences of application of voltage to said at least one winding as set forth in the preceding paragraph.

In a still further aspect the invention consists in a method of controlling the commutation of power to an electrically commutated motor (ECM) having a rotor and a stator with a plurality of energisable windings and switching devices for connecting of said windings to a power supply, using control means including commutation means to determine commutation sequences of application of voltage to at least one winding of said windings through said at least one switching device of said switching devices to cause current flow in said at least one winding, said method comprising the steps of applying voltage to said at least one winding so as to cause said current to flow in said at least one winding, sensing power or a component thereof in said at least one winding by use of sensing means, while current is flowing in said at least one winding to provide information in the form of control signals and passing said control signals to said control means to control said at least one switching device to control the commutation of power to said at least one winding.

In a still further aspect the invention consists in a method of controlling a laundry machine having a washing container, an agitator and a spin tub within said washing container, said agitator being connected so as to be rotated back and forth by an electronically commutated motor and to be rotated with said spin tub when driven continuously in one direction, said motor having a rotor and a stator with at least one energisable winding and at least one switching device for connecting said at least one winding to a power supply, using control means including commutation means to determine commutation sequences of application of voltage to said at least one winding as set forth in the preceding paragraph.

In a still further aspect the invention consists in a control apparatus for controlling the commutation of power to an electronically commutated motor (ECM) having a rotor and a stator with a plurality of energisable windings and switching devices for connecting said windings to a power supply, said apparatus comprising control means including commutation means to determine commutation sequences of application of voltage to at least one winding of said windings through said at least one switching device of said switching devices to cause current flow in said at least one winding, said current having a detectable wave form which is able to be sensed, sensing means for sensing at least part of said current wave form in said at least one, winding and processor means for deriving information relating to said current wave form at desired intervals of time and passing said information in the form of control signals to said control means to actuate said control means to control said at least one switching device to control the commutation of power to said at least one winding.

In a still further aspect the invention consists in a laundry machine having a washing container, an agitator and a spin tub within said washing container, said agitator being connected so as to be rotated back and forth by an electric motor and to be rotated with said spin tub when driven continuously in one direction, said motor having a rotor and a stator with at least one energisable winding and at least one switching device for connecting said at least one winding to a power supply, using control means including commutation means to determine commutation sequences of application of voltage to said at least one winding as set forth in the preceding paragraph.

In a still further aspect the invention consists in an apparatus for controlling the commutation of power to an electronically commutated motor (ECM) having a rotor and a stator with a plurality of energisable windings and switching devices for connecting of said windings to a power supply, said apparatus comprising control means including commutation means to determine commutation sequences of application of voltage to at least one winding of said windings through said at least one switching device of said switching devices to cause current flow in aid at least one winding, sensing means for sensing power or a component thereof in said at least one winding while current is flowing in said at least one winding at desired intervals of time and processor means for providing information in the form of control signals and passing said control signals to said control means to control said at least one switching device to control the commutation of power to said at least one winding.

In a still further aspect the invention consists in a laundry machine having a washing container, an agitator and a spin tub within said washing container, said agitator being connected so as to be rotated back and forth by an electric motor and to be rotated with said spin tub when driven continuously in one direction, said motor having a rotor and a stator with at least one energisable winding and at least one switching device for connecting said at least one winding to a power supply, using control means including commutation means to determine commutation sequences of application of voltage to said at least one winding as set forth in the preceding paragraph.

In a still further aspect the invention consists in a control apparatus for controlling the commutation of power to an electronically commutated motor (ECM) having a rotor and a stator with a plurality of windings and switching means for selectively connecting said windings to a power supply, said apparatus comprising control means including commutation means to determine commutation sequences of application of voltage to a first said winding with switching means to cause current flow in said first winding, said current having a detectable wave form which is able to be sensed, using means for sensing at least part of said current wave form in said first winding and timer means for allowing a predetermined period of time to elapse after sensing said part of said current waveform before passing a signal to said commutation means to commutate a second said winding.

In a still further aspect the invention consists in a laundry machine having a washing container, an agitator and a spin tub within said washing container, said agitator being connected so as to be rotated back and forth by an electric motor and to be rotated with said spin tub when driven continuously in one direction, said motor having a rotor and a stator with at least one energisable winding and at least one switching device for connecting said at least one winding to a power supply, using control means including commutation means to determine commutation sequences of application of voltage to said at least one winding as set forth in the preceding paragraph.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

FIG. 7b is a diagram of phase currents v time in the phases of an electronically commutated motor as used in accordance with the present invention;

FIG. 10 is a table of expected current sensor output patterns corresponding to those shown in FIG. 9;

FIG. 12 is a diagram showing output commutation patterns used to commutate an ECM in accordance with the present invention.

DESCRIPTION OF RELATED ART

Figure 1:
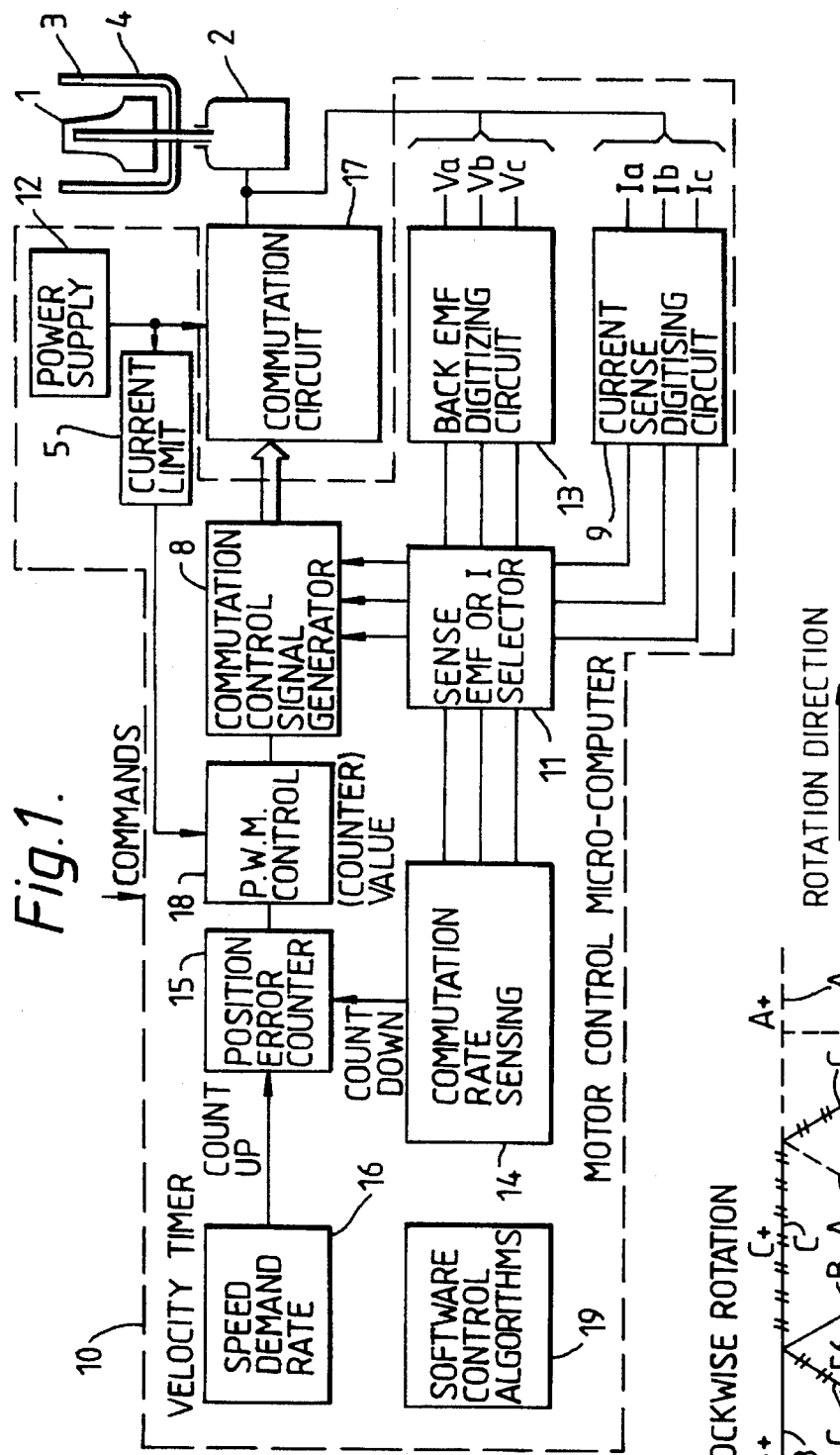
FIG. 1 is a diagram of a motor control and commutation means in accordance with the present invention.

Rotation of a brushless DC electronically commutated motor (ECM) is effected by energising (commutating) the motor phases in a cyclic fashion, so that an attractive force occurs between the magnetic fields of the rotor and stator. In order to maintain rotation, feedback of rotor position is required, so that the phase energisation ocuurs at the correct time.

In order to receive feedback from the motor it has been common to mount sensors on the motor. For example optical shaft encoders or Hall sensors. However these sensors have the disadvantage that they require accurate mounting, necessitate running extra wires to the motor and generally run in a harsh environment. These problems make the above options less favourable.

Another method of obtaining the required feedback for commutation, is to look at the back EMF of one of the motor phases. This technique does not require sensors to be mounted in the motor. However to sense the back emf of a winding, the winding must not be energised that is; in a three phase motor, current can only flow in two phases at any one time. This has significant disadvantages at high speeds when the numbers of phase windings is large.

The two most commonly used techniques to sense rotor position are:
(i) Optical or magnetic sensors mounted on or near the rotor.
(ii) Back EMF sensing.

Both of the above techniques have limitations.

The use of optical or magnetic sensors requires accurate mounting, interconnecting harnesses, and the ability for the sensors to operate in harsh environments. Thus this technique, in comparison with back EMF sensing, has more costly hardware overheads.

Back EMF sensing may not have the same hardware limitations as the above sensor technique but it places limitations on the operation of the motor. With Back EMF sensing not all phases can be energised while Back EMF measurements are being taken and hence motor speed is limited by the supply voltage.

A technique for commutating in BCM is disclosed herein which does not require sensors mounted near the motor and does not limit the Back EMF to less than the supply voltage.

When a multi phase motor is running at a steady speed under equilibrium conditions, there is a phase relationship between the voltage and current waveforms.

If we look at the current wave forms preferably at the zero crossing points of the current waveform we can infer (calculate) or derive from the information obtained, when to make the next phase commutation, preferably when the changes in speed and operating conditions are small during the period of time from one commutation to the next. This condition applies at high speed, e.g. in particular at the high spin speeds e.g. 1100 RPM of a washing machine with high inertial loads.

Modern microprocessors allow the sensing of the current waveforms to be combined with an algorithm to determine the commutation points as well as to control the motor performance.

A method to change from back emf sensing using an unenergized winding, to using the current zero crossing has also been developed so that optimal motor performance may be achieved over all speed ranges.

DESCRIPTION OF THE PREFERRED EMBODIMENTS

FIG. 1 is shown in U.S. Pat. No. 4,857,814, the disclosure of which is incorporated herein by reference.

Referring to FIG. 1 of the drawings, an electronically commutated motor (ECM) 2 is shown and is described in detail in the Boyd/Muller U.S. Pat. No. 4,540,921.

The ECM 2 constitutes a stationary assembly having a plurality of winding stages adapted to be selectively commutated, and rotatable means associated with that stationary assembly in selective magnetic coupling relation with the winding stages. The winding stages are commutated without brushes by sensing the rotational position of the rotor as it rotates within the stationary assembly. DC voltage is selectively applied by commutation circuit 17 to the winding stages in preselected orders of sequences, The control apparatus comprises a general purpose microprocessor 10 e.g. a TM5370 which receives commands for example from a console (not shown) having a series of push buttons or other user operable controls. Pulse width modulation (PWM) control means 18 and a commutation control signal generator 8 drive a three phase power bridge commutation circuit 17. The necessary power supplies are fed by a DC Power supply 12. In addition, signals are fed from a winding of the ECM which is unpowered when other windings in the stator of the ECM are under power when the motor is operating below a certain minimum speed of rotation. A current sense digitizing circuit 9 is also provided and the operation of this circuit will be explained further later. The EMF digitizing circuit 13 and the current sense digitizing circuit 9 are both connected to a selector 11 which provides digitized back EMF signals to the commutation control signal generator 8 when the motor speed is below a certain minimum speed of rotation and provides current sensing digitised signals to the commutation control signal generator when the motor speed is above the minimum speed will be explained further later. Signals from the motor windings are fed to a back EMF digitizing circuit 13, as described in the Boyd Muller Specification and are thence supplied to the microcomputer 10. Power switching circuits also feed through a current sensing circuit 5 to the microcomputer 10. A loop position error indicator 15 and a speed demand rate velocity timer 15 are provided and a commutation rate sensing device 14 but any other rotor speed and position varying device may be used. Software control algorithms 19 are also provided.

The electric motor 2 (FIG. 1), is an electronically commutated motor (ECM) having a rotor and a stator. The rotor is connected to an agitator 1 and may also be selectively connected to a spin tab 3 in a washing container 4 of a laundry machine. The motor 2 rotates the agitator back and forth to provide an agitation effect on clothes plaid in the washing container during an agitation cycle, and the agitator and spin tub are connected together so as to be rotated continuously in one direction during a spin cycle. The commutation switches and control for the ECM are shown in more detail in FIG. 2. The rotor of the ECM is a permanent magnet rotor, as described in U.S. Pat. Nos. 4,857,814 and 4,540,921.

At low speeds, for example, below 300 rpm, power is commutated to only two of the three motor phases so that there is always one unenergised winding used to sense back emf. The back emf indicates rotor position as disclosed in U.S. Pat. No. 4,857,814. Above 300 rpm the control circuitry in the present invention uses signals derived from the power waveforms preferably the current waveforms in one or more motor windings to calculate when to commutate the motor as explained later.

Figure 2:
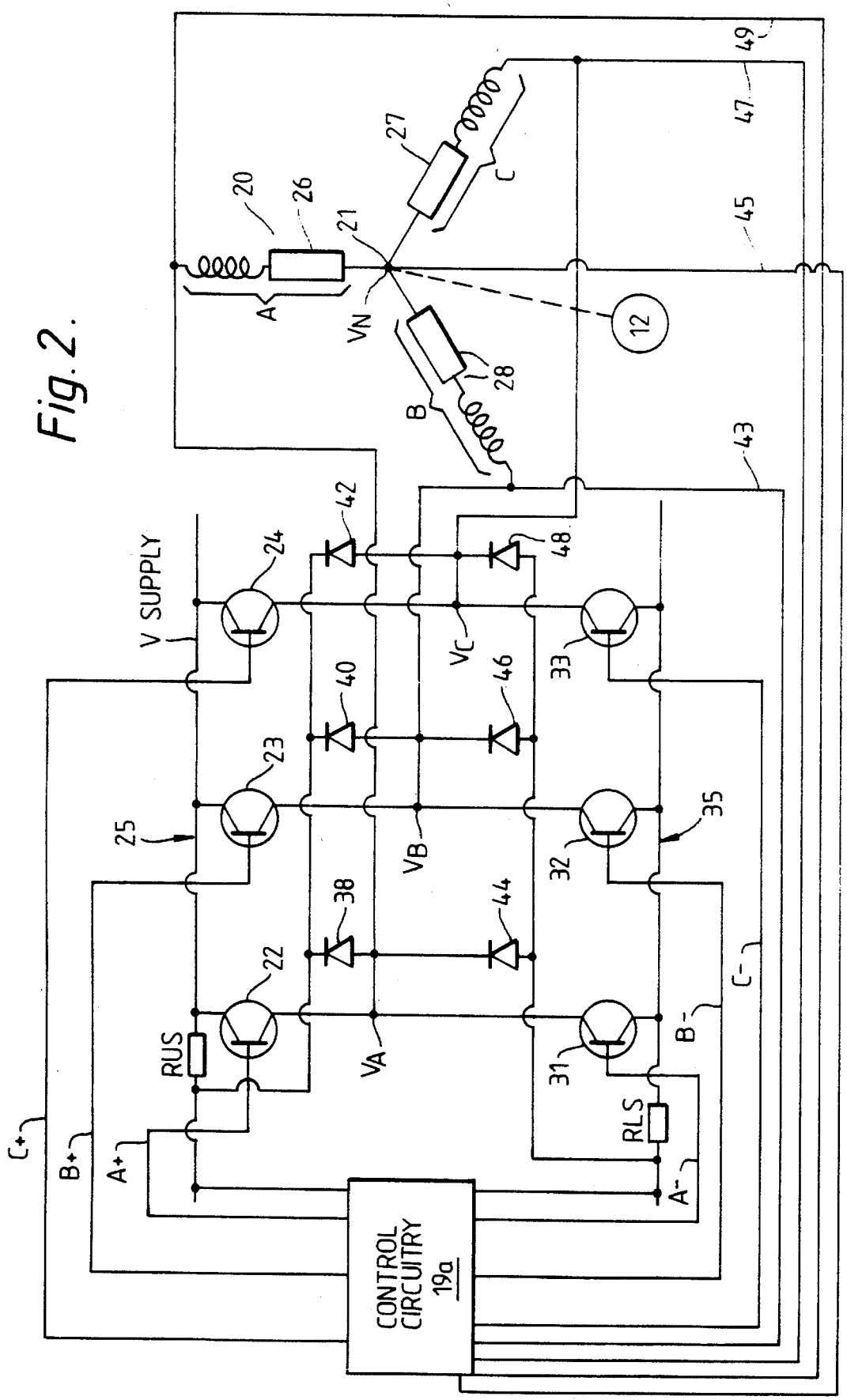
FIG. 2 is a diagram of part of the motor control and commutation means of FIG. 1 shown in more detail.

Thus referring to FIG. 2 there is provided an ECM 20 having three windings or phases A, B and C with a common point 21 and a switching bridge in which three switching devices 22, 23 and 24, which are e.g. IGT's or FET's, connect the supply positive rail 25 (V supply) from a full wave rectified mains power supply to the windings 26, 27 and 28. Three further switches 31, 32 and 33 connect the ends of the windings to the power supply negative rail 35, the six switches being in a totem pole configuration. The six switches may also be protected by known snubbing circuits (not shown). The upper switches 22, 23 and 24 may be referred to as the A+, B+ and C+ switches and the lower switches 31,32 and 33 may be referred to as the A−, B− and C− switches. Free wheel diodes 38, 40, 42, 44, 46 and 48 allow currents induced in the windings to be returned to the supply rails in the known way. Connected in series with rail 35 is a lower sense resistor RLS. The RLS resistor is of low value, e.g. 0.1 ohm and is used for current control. A control means comprising control circuitry 19a is provided to control commutation of power to motor and lines 43, 45, 57 and 49 provide back emf signals from the motor windings to the control circuitry 19a.

Motor 2 is commutated using pulse width modulation (PWM) methods and the operation of motor 2 is more fully described in U.S. Pat. No. 4,857,814 the disclosure of which is incorporated herein by reference.

"To cause the rotor 3 of motor 2 to rotate in a clockwise direction, voltages are applied to the windings from rails 25 and 35 and assuming that winding 26 is A, winding 27 is C and winding 28 is B and that if we wish to have power on the motor at zero degrees such that we have a maximum EMF across the motor and thus maximum Torque in the clockwise direction, switches 22 (A+) and 33 (C−) would be switched on, connecting power from the positive rail 25 through switch 22 to the A phase windings 20 through the neutral point 21 and the C phase windings 27 through switch 33 to negative rail 35. Thus to obtain maximum Torque in the motor the connections would be A+ and C− to the 60 degree angle and then B+ and C− to the 120 degree angle then B+ and A− to 180 degree angle then C+ and A− to the 240 degree angle, C+, B− to the 300 degree angle, A+ and B− to the 360 degree angle, the sequence commencing at A+ and C− again. Thus there is a sequence of six different patterns and each goes to 60 degree angle of rotation giving a total of 360 degrees in rotation".

Figure 3:
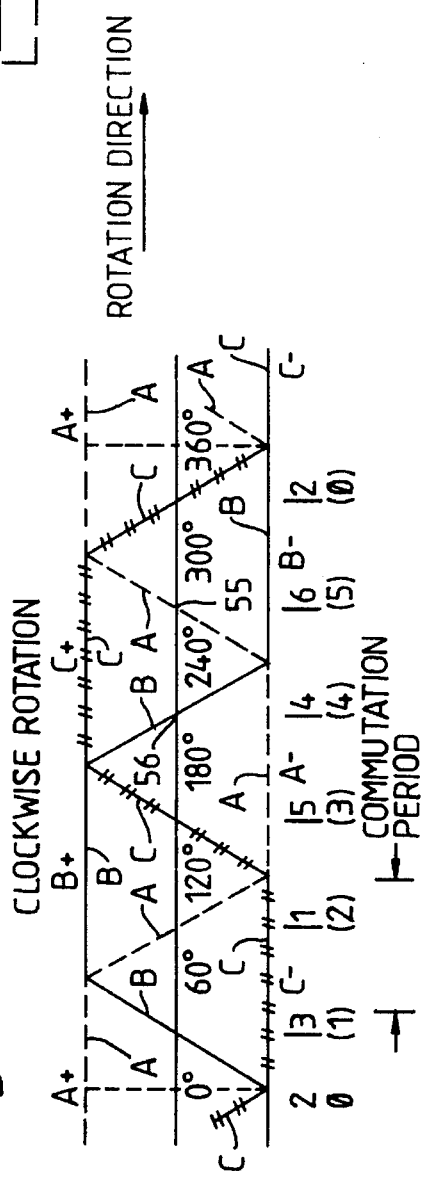
FIG. 3 is a diagram of electromotive forces (EMF's) induced in the windings of a three phase electronically commutated motor for a single electrical rotation of the rotor in degrees, when the rotor is rotated in the clockwise direction.

Looking now at operating the motor 20 as a generator, i.e. without power being applied to the windings, if the rotor of the motor is rotated in the clockwise direction and voltage measurements are taken at the ends of the windings 26, 27 and 28 with respect to the star point 21, i.e. the centre of the three phase windings, EMF's will be generated and in FIG. 3 such EMF's have been plotted. The figure illustrates a single electrical revolution of the rotor in electrical degrees and essentially shows the wave forms of a three phase generator. The voltages induced in the three windings have been indicated in FIG. 3 by the letters A (pecked line), B(full line) and C(slashed line). For example in A winding it will be seen that in FIG. 3 the EMF goes from a maximum Positive at zero degrees through zero voltage to a maximum Negative, at 180 degrees then goes from maximum Negative through zero voltage to maximum Positive, @ 360 degrees thus completing one electrical cycle.

When the ECM is operating under steady state conditions under power its internal operating characteristics approximate those of a synchronous motor. The back EMF's are generated as described above in relation to operating only as a generator.

Figure 4:
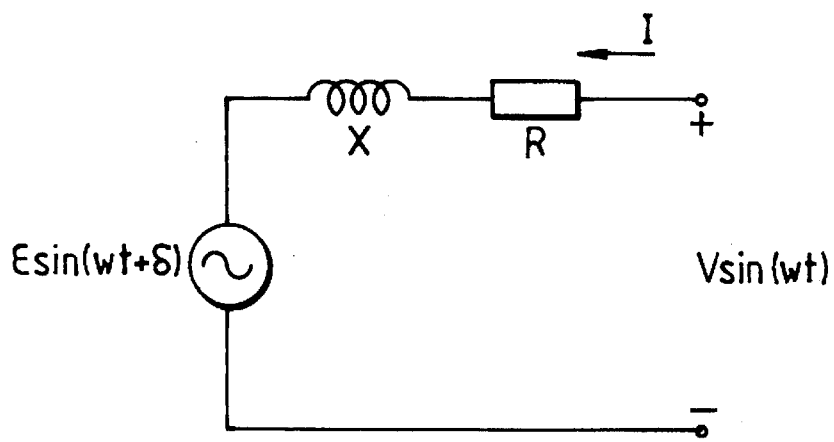
FIG. 4 is a simplified equivalant circuit diagram for a synchronous motor.

Referring to FIG. 4, an equivalent circuit for a synchronous machine operating as a motor is shown in which the voltage applied to the sister terminal windings is represented by V sin (wt) and the back EMF induced in the windings is shown as E sin (wt+δ). The resistance of the windings is represented by resistor R and the reactive component of the overall winding impedance is represented by inductance X.

Figure 5:
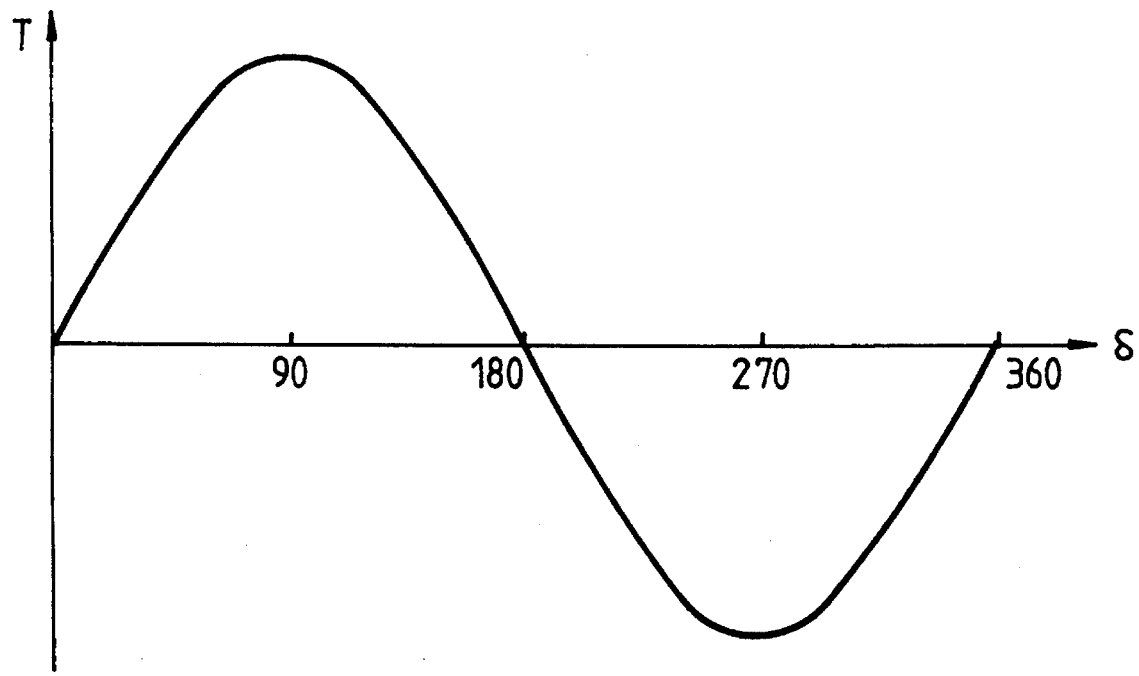
FIG. 5 is a graph of Torque v the angle between a principal magnetic axis of the stator of an ECM and the appropriate rotor pole in electrical degrees.

Although the diagram of FIG. 4 assumes that the applied and induced voltages and currents flowing through the windings are sinusoidal, the ECM of the present invention when operating at speed as a synchronous machine will very closely approximate the equivalent circuit shown in FIG. 4. Commutation of the machine establishes a phase relationship between the currents flowing in said windings and the EMF's induced therein. In FIG. 4, it is assumed that the voltage applied to the windings leads the back EMF by an angle δ which is representative of the phase angle between the interacting magnetic fields in the machine, i.e. the principal axis oil of the field of the stator windings being commutated and the principal axis of the appropriate rotor field and therefore determines the torque produced by the motor. Referring to FIG. 5, when the angle δ is between 0 degrees and 180 degrees electrical, a positive torque is produced and as δ increases from 0 degrees to 90 degrees the torque also increases to a maximum at 90 degrees and then decreases between 90 degrees and 180 degrees. If the applied voltage across the winding terminals lead the back EMF by more than 180 degrees electrical then negative torque is produced and the motor acts as a generator. The negative torque increases if it is between 180 degrees and 270 degrees and decreases between 270 degrees and 360 degrees. If δ is made sufficiently large so that the voltage applied to the motor windings leads he back EMF by 180 degrees to 360 degrees, then the motor may also be made to act as a generator so the motor may be effectively braked.

Referring to FIG. 4 once again w note that R is generally small and may be neglected at high speeds as it is insignificant compared with X which is proportional to speed. Neglecting the resistance R allows the phasor diagrams of FIG. 6(a,b) to be drawn being a very approximate representation of the ECM at high speeds. For sinusoidal currents to be sustained a relatively large motor inductance is required for example 30 milli henries per phase. Note the magnitudes and angles drawn are for explanation only and are not meant to represent any particular motor.

Figure 6A:
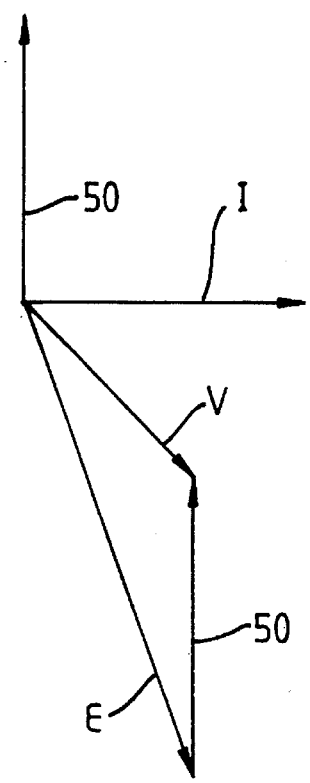
FIG. 6a is a phasor diagram of the principal voltages and currents in an electric motor as used in accordance with the present invention with the motor current leading the driving voltage and with the phasors rotating in the anticlockwise direction.

As can be seen from FIG. 6a there is a phase relationship between the driving voltage V and the motor current I. This relationship is influenced by the back emf voltage E. The vector sum of the voltage across the inductor represented by phasor 50 and the back emf voltage equals the voltage across the motor windings. In FIG. 6a the current I leads the driving voltage V.

The shape of this phasor diagram changes if the operating conditions are changed for example, an increase in the supply voltage or a change in the motor parameters.

Figure 6B:
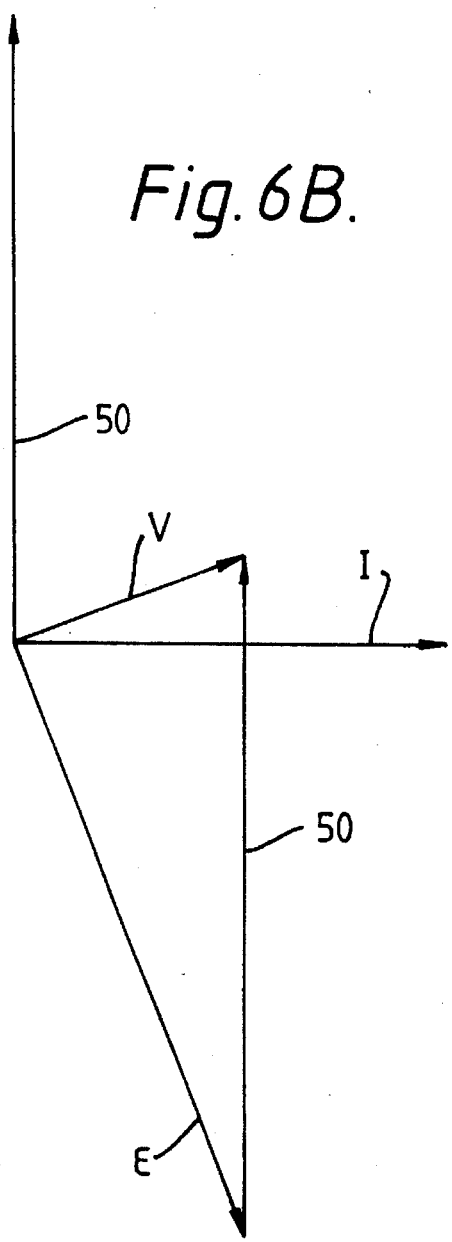
FIG. 6b is a phasor diagram for a motor as described in FIG. 6a with the motor current lagging the driving voltage and the phasors rotating in the anticlockwise direction.

FIG. 6b is a phasor diagram wherein the motor current I lags the driving voltage V. Again phasor 50 represents the voltage across the motor inductance and when added (vectorially) with the emf $\epsilon_1$ equals the driving voltage V.

Figure 7A:
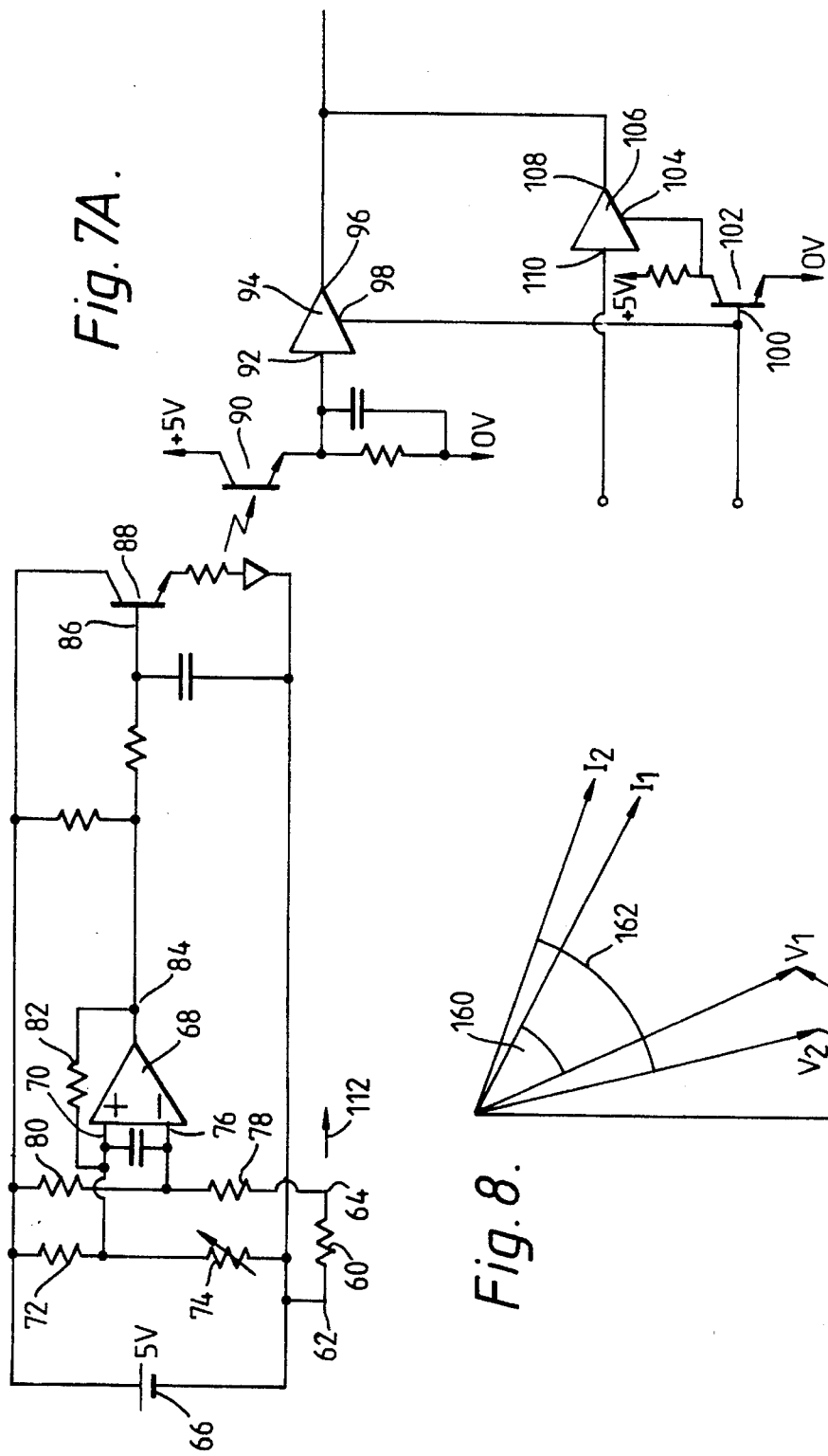
FIG. 7a is a simplified circuit diagram of a current direction sensing circuit as used in accordance with the present invention.

FIG. 7a shows a circuit which provides the microprocessor with a digital representation of a motor phase current. Referring to FIG. 7a a current sensing resistor 60 is provided between point 62 and point 64 such that resistor 60 is in series with the motor winding, thus referring to FIG. 2, point 62 is connected to one of points VA, VB or VC and point 64 is connected to the end of a motor winding shown by one of points 64 in FIG. 2. Referring again to FIG. 7, resistor 60 may be for example 0.25Ω and the voltage between point 62 and point 64 will be representative of current flowing through the motor winding in which resistor 60 is connected in series. The circuit in FIG. 7 is provided with a supply 66 of e.g. 5 volts and has a comparator circuit e.g. a comparator 68 having a non-inverting input 70 which is maintained at a reference voltage relative to supply 66 by resisters 72 and 74 and an inverting input 76, the potential of which is dependent upon the potential of point 64 and this potential is divided by resisters 78 and 80. The gain of comparator 68 is controlled in the known way by the selection of resistor 82 and the output 84 of comparator 68 provides signals to the base 86 of transistor 88. The emitter of transistor 88 is connected to opto coupler 90 and the emitter of opto coupler 90 is connected to an input 92 of tri-state buffer 94. The output 96 of tri-state buffer 94 is connected to e.g. the A phase rotor position control input of a micro processor which has control means for control and commutation of the ECM. Tri-state buffer 94 has a further input 98 which is connected to an emf or current sensing enable line at input 100 at the base of transistor 102. The collector of transistor 102 is connected to an input of 104 of a further tri-state buffer 106 and the output 108 of tri-state buffer 106 is also connected to the A phase rotor position control input of the microprocessor which is connected to output 96 of tri-state buffer 94. A back EMF input line is connected to input 110 of tri state buffer 106. The operation of the circuit of FIG. 7a is as follows. Current flowing through the winding e.g. the A phase winding in which resistor 60 is connected in series will establish a voltage across resistor 60 and dependent on the direction of flow of the current through the winding the potential of point 64 will be higher or lower than that of point 62. Thus if the current is flowing in the direction indicated by arrow 112 and the potential at inverting input 76 will be lower than that at input 70 and the output of comparator 68 will be high, so a logic high signal will be present at input 92 of tri-state buffer 94. Assuming that the EMF/current sense enable line is high so that current sensing has been selected by the control circuitry then output 96 of tri-state buffer will be high and a high input will be present at the A phase rotor position input of the micro processor. If current is flowing through the winding in the opposite direction to that shown by arrow 112 when the output of tri state buffer 94 will be low and a low signal will be present at the A phase rotor position input to the microprocessor. When the EMF/current sense enable line is high as above described, then the emitter of transistor 102 will generate a low signal at input 104 to tri-state buffer 106 so that any emf input from the EMF in put line will not be transmitted to the output 108 at the tri-state buffer and will not affect the A phase rotor position input of the microprocessor. However, when the EMF/current sense enable line is low, then input 98 of tri-state buffer 94 will also be low and the output 96 of tri-state buffer 94 will not affect the A phase rotor position control input to the micro processor. Also, when the EMF/ current sense enable line is low then the emitter of transistor 102 will be high to activate tri-state buffer 106 so that the signals present on the emf input line are transmitted to output 108 of the tri-state buffer and are present on the A phase rotor position control input to the microprocessor. One circuit as shown in FIG. 7 may be used in conjunction with appropriate software to provide information for commutating all the motor phases. However in the following description the one circuit as shown in FIG. 7 is used in each of the three phases. The three digital signal outputs from these circuits are combined to form a three bit current sense input pattern which is analogous to the signals that would be obtained from Hall sensors mounted in the motor. The signal from each phase will remain on for 180 electrical degrees and then go off for 180 degrees. The signals between phases are separated by 60 electrical degrees. Thus for one complete electrical revolution six distinct three bit current sense input patterns will be detected by the microprocessor. These three bit current sense input patterns are used to decode which switching devices should be turned on next. They are also used to provide speed feed back so that the motor speed can be controlled.

FIG. 7b shows current waveforms A, B and C in phases A, B and C and is a timing diagram of current sense mode operation for a given speed. A method to enter this mode will be explained later.

As can be seen from FIG. 7b all commutation events are preceded and followed by a current zero crossing. For example in FIG. 7b the current in B phase passes through zero at point 10 and commutation of the A+ switch (switch 22 in FIG. 2) occurs at point 152. Before point 152 switches A−, B− and C+ (31, 32 and 24 in FIG. 2) were "on". After point 152, switches A+, B− and C+ (22, 32 and 24 in FIG. 2) are "on". When zero crossing 150 occurs a timing means comprising a software timer, Timer A, is reset and begins timing from zero. When the commutation of A+ occurs at point 152 the microprocessor enables its interrupts such that a change in the three bit current sense input pattern generates an interrupt.

When this interrupt occurs, at point 154, the microprocessor saves the value of timer A into a memory location (TIME VALUE), then it vectors to an interrupt routine. This routine will be called SENSE INTERRUPT for reference.

After clearing the interrupt flag the microprocessor reads and saves the three bit current sense input pattern from the current sensors. It compares this pattern with the next pattern from a software look up table. This look up table represents the correct commutation sequence. If the patterns are not the same then the microprocessor returns from the interrupt routine and assumes that noise generated the interrupt.

If however the input pattern is the same the microprocessor will reset Timer A to count from zero. Timer A effectively measures the time between successive commutations which in normal operation is 60 electrical degrees. It will then divide this value by 60 and multiply by a desired phase delay value to obtain a time period corresponding to a desired phase angle. The result of this calculation (some fraction of sixty electrical degrees) represents t predetermined time period corresponding to the desired phase angle and is programmed in to Timer A's compare and interrupt function. That is when the value of Timer A equals the value calculated, a commutation interrupt will be generated, to commutate the power devices. Note this will occur at point 156 in FIG. 7b. Thus by sensing power or a component of power such as current in at least one of the motor windings, signals are passed to the control means which allow control of the commutation of power to the ECM. Also, by sensing a part of a current wave from in a first winding information is derived from which the winding, or further windings may have power commutated thereto at a desired time.

Figure 8:
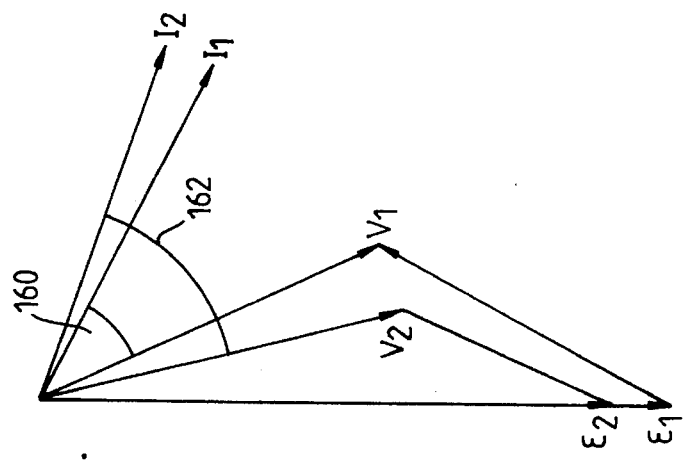
FIG. 8 is a phasor diagram for the phasors shown in FIG. 6a but showing the effects of a change in phase angle between motor current and driving voltage with phasors rotating in the anticlockwise direction.

FIG. 8 shows the effect of varying the time between the current sense transition and when the commutation occurs. Referring to FIG. 8 an applied power supply voltage is shown as phaser V, the back EMF is shown as phaser $\epsilon_1$, and there is an angle 160 between the winding current $I_1$, and voltage $V_1$. When the phase angle is increased to angle 162 between $V_2$ and $I_2$, the back EMF $\epsilon_2$ becomes smaller, indicating a drop in motor speed. For a larger phase angle the speed decreases i.e. the phase angle can be used for speed control.

It should also be noted that the average voltage phaser is lower even though the same supply voltage is maintained as the phase angle is changed. With the larger phase angle the current and voltage waveforms move in such a way as to cause the free wheel diodes to conduct for longer. During the time for which an upper diode is conducting the phase point is effectively connected to the rail. Whilst a lower diode is conducting it is connected to 0 volts. As the waveforms are symmetrical the average contribution to the driving voltage, from diode conduction, is half supply voltage. Thus a longer diode conduction time lowers the effective driving voltage.

The commutation interrupt is entered when Timer A reaches the value programmed as explained before. The output pattern from the microprocessor is updated, changing the conducting power devices. The three bit current sense input pattern saved in the sense interrupt routine is used as a pointer for the output pattern table.

The new pattern will initially only have two devices turned on. This is called a non-overlap pattern. If the microprocessor commutated from one three phase pattern to the next, one of the totem poles would have its lower device (31, 32 or 33 in FIG. 2) being turned on whilst the upper (22, 23 or 24 in FIG. 2) was being turned off (or vice versa). This situation can cause a shoot through condition to occur. A shoot through condition is where an upper and lower device of the same phase conducting simultaneously and leads to a short circuit across the motor power supply.

Figure 9:
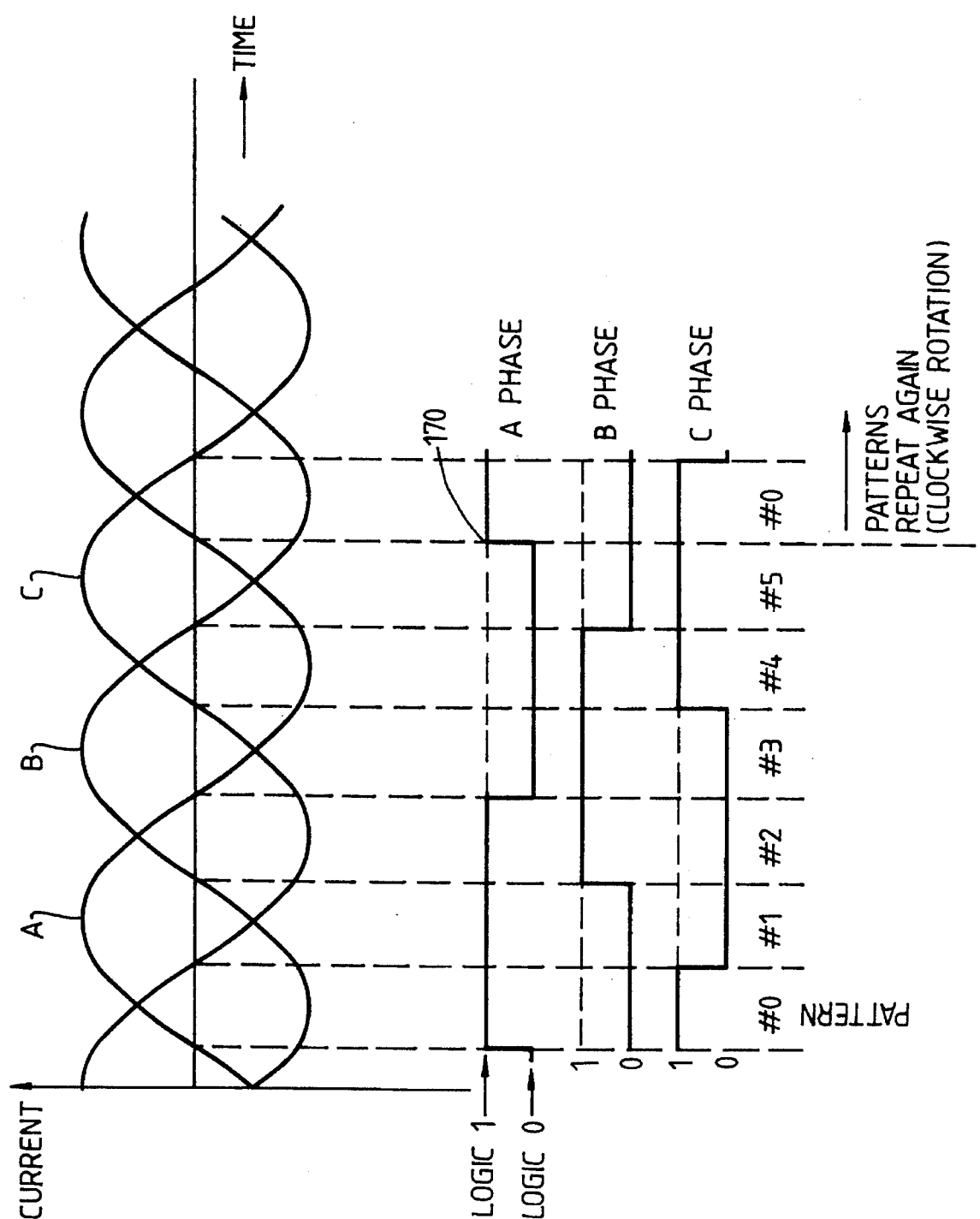
FIG. 9 is a diagram showing a graph of motor winding currents v time and the current sensor output corresponding to winding currents and output commutation patterns in accordance with the present invention.

FIG. 9 shows the current waveforms in the three phases under normal operation and the six, three phase current sense output patterns.

As explained before the three bit current sense input pattern is used as a pointer to get the output pattern from the output pattern table shown in FIG. 12. FIG. 12 shows the three phase output patterns with the intermediate non-overlap patterns. Thus when input pattern 0 is sensed by the microprocessor, the output pattern 0 will be used to select which power devises will be turned on. It is important to note that the output pattern can be offset from the input pointer to alter the phase relationship between the applied voltage commutated to the motor windings and the current flowing in the windings. The ability to alter the phase relationship increases the range of operating parameters.

The commutation interrupt routine also decrements a speed loop error counter which is used to control the speed as explained later.

Before returning from the commutation interrupt routine the last operation the microprocessor performs is to increment (in module 6) the pointer which references the table of digital current sense patterns. This means the pointer will now point to the next pattern to be expected. It will also enable the next sense interrupt edge of the current sense circuit (FIG. 7*a*) output, in the case C phase negative edge 170.

FIG. 10 is a table of expected current sensing patterns or Hall effect or digitised back EMF patterns corresponding to the output pattern 0 to 5 shown in FIG. 9. In FIG. 10, "1" indicates an "on" state or high logic level and "0" indicates an "off" state or low logic level.

The software also maintains, or changes, the desired speed of operation.

Figure 11:
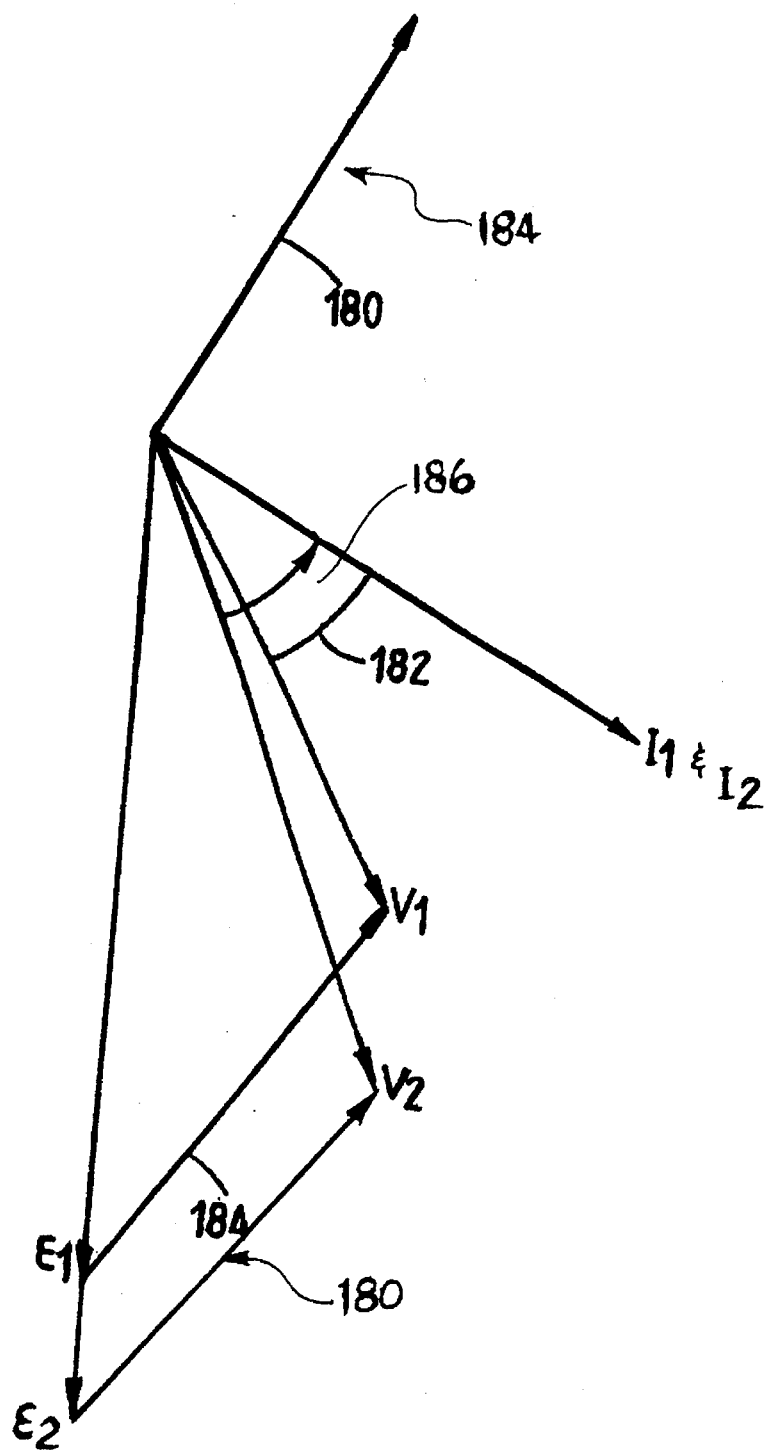
FIG. 11 is a phasor diagram showing the effect of a change in driving voltage for the phasors shown in FIG. 6a and FIG. 8 with the phasors rotating in the anticlockwise direction.

FIG. 11 is a phasor diagram showing the change in current, back EMF and phase angle when the magnitude of the voltage applied to the ECM is increased. Before the increase in applied voltage, the voltage is shown as phasor $V_1$, the current is $I_1$, the back EMF as $\epsilon_1$, and the voltage across the motor inductance as phasor 180. The phase angle is 182. After the magnitude of the applied voltage is increased, the voltage phasor is $V_2$, the current $I_2$, the back EMF $\epsilon_2$ and voltage across the motor winding is 184. The new phase angle is 186. The new EMF $\epsilon_2$ is greater than $\epsilon_1$, indicating an increase in motor speed. Thus the speed will increase if the driving voltage is increased. Thus speed control can also be achieved by controlling the pulse width modulation (PWM) of the switching devices as disclosed in the aforementioned U.S. Pat. No. 4,857,814. The duty cycle D or PWM rate is calculated as D=t on/(t on+t off). During the "t on" period the switching devices are "on" according to the switching patterns shown in FIG. 12. Those switching devices referred to in FIG. 12 are in the "on" state e.g. the reference in FIG. 12 to the "0" output non-overlap pattern indicates that switch A+ is "on", switch B is being controlled by PWM and the switches relating to C phase are "off". During the time "off" the switching devices marked PWM in FIG. 12 are turned "off". This PWM strategy has been developed to maintain the symmetry of the three phase waveforms. The PWM duty cycle is software controlled with the desired ratio being obtained by writing a value to a PWM register in the microprocessor. A second Timer B is set up to toggle the PWM output "on" when it reaches its maximum count and returns to zero. When it reaches the value in the PWM register it toggles the output "off". The programmable value for the maximum value of the count determines the PWM frequency.

To implement speed control, a third timer C, is used to set up a time base. This is an interrupt driven timer. The following routine forms the timer interrupt.

The microprocessor first checks a flag called Update PWM. If this is true the value of speed loop error count is written to the PWM register. This flag is set whenever the speed loop error counter is changed (in the commutation interrupt or later in this routine). The register is updated here and not immediately when the value is modified to add to the speed stability.

A register, called LONG TIMER, is updated, this is used in the main routine. Another register called speed is then decremented. If speed does not equal zero then program control returns to the main program. When speed equals zero the speed loop error counter is compared with its maximum allowable value. If it is less than the maximum value it is incremented, the update PWM flag is set true and speed is reset to its reference value. The microprocessor then returns from the interrupt.

It can be seen from the above that value of speed and the timer interrupt frequency will determine the motor speed. If the motor commutation rate is too slow there will be a net increase to the speed loop error counter and hence the PWM register will be incremented. If the commutation rate is too fast the reverse will happen. If the speed is correct there will be no net change to the PWM register value as the speed loop error count will be incremented and decremented once per commutation.

The main loop determines how quickly the PWM register is updated. If the time between updating this register is small then the motor will accelerate quickly. A long timer is used in conjunction with the maximum allowable value for the speed loop error counter to control the acceleration. When a fast acceleration is required the long timer is loaded with a small number. After this value is reached the speed loop error count is allowed to increment in unitary steps to the maximum allowable value.

It is important to control the acceleration rates or else the three phase currents become unstable and the feedback will no longer be available for control. The present implementation coped with PWM updates every 500 milliseconds quite adequately, As explained before, below a certain speed the motor is commutated using back EMF sensing and above the chosen speed current sensing is used. However for the current sensing technique to work three phase currents must be present for the microprocessor to sense from. A technique was developed to start the three phase currents flowing so that three phase current sensing can be used.

First a change speed needs to be chosen, for example 300 rpm. The time between commutations is calculated for the chosen speed. Now assume that the motor is rotating at the chosen speed. The microprocessor then waits to the end of a commutation. A flag is set to change the mode of operation from commutation of power to two phases to three phases i.e. patterns will be output from the three phase tables referred to with reference to FIGS. 9 and 12 instead of the two phase tables. The required PWM values for a particular speed are very different from two phase to three phase, hence the speed loop control is temporarily disabled and a new PWM value is loaded. This value may be predetermined or interpolated from the present value of two phase PWM. At the next (and last) EMF sense the first three phase pattern is output. The next electrical cycle (six commutations) are made under open loop conditions with a timer without rotor position feed back. This is sufficient time for the three phase currents to establish themselves so that the microprocessor can close the loop again and begin sensing off the signals from the current sensors with the current sense line (FIG. 7) enabled.

From the foregoing it will be seen that methods of and/or apparatus are disclosed for indicating the position of an ECM when all three phases are being energised and controlling the ECM using such information without the use of Hall effect sensors or optical sensors with the attendant advantages of using less connecting wires and enabling the attainment of higher speeds.

We claim:

1. A method of controlling the commutation of power to an electronically commutated motor having a rotor and a stator with energizable windings and switching devices for connecting each winding to a power supply, which uses a controller to set the state of the switching devices to determine commutation sequences of application of voltage to said stator windings to cause torque producing current flow in said stator windings to thereby rotate said rotor, said method comprising the steps of:

(1) applying voltage to said windings so as to cause said current to flow therein, (2) monitoring the torque-producing current waveform in at least one of said windings to detect occurrences of a predetermined waveform characteristic, said occurrences being cyclical and indicative of rotor position, (3) passing the detected rotor position information to said controller, (4) the controller after each detected occurrence using said information to determine the state said switching devices must attain at the end of a predetermined delay after each detected occurrence to ensure powered rotation of said rotor, and (5) after said predetermined delay causing the controller to place the switching devices in the so determined state.

2. A method according to claim 1, wherein the controller determines the state that said switching devices must attain at the end of the predetermined delay after each detected occurrence by accessing a stored table of sets of allowable switching states and selecting from the table a set of switching states determined by the rotor position information passed to it at the start of said predetermined delay.

3. A method according to claim 2, wherein the rotor position information is coded, said table includes for each stored set of switching states a rotor position code indicative of the position of the rotor immediately prior to the set of switching states required to be implemented for powered rotation of the rotor beyond that rotor position, and said controller compares the rotor position code passed to it with the rotor position codes stored in the table and upon finding a match selects the corresponding set of switching states and switches the switching devices to that set of states at the end of said predetermined delay.

4. A method according to claim 1, wherein said predetermined delay is controllably variable during motor operation, said delay determines the phase relationship between current and voltage in each winding, and said delay is varied to control the speed of the motor.

5. A method according to claim 1, wherein the characteristic part of the current wave form detected is the waveform zero crossings.

6. A method according to claim 1, wherein the torque producing current in each winding of said motor is monitored and the controller determines the state said switching devices must attain from a combination of the rotor position information derived from each winding.

7. A method according to claim 1, wherein an alternative method is used in place of step 2 to indicate rotor position when the speed of the motor is less than a predetermined speed and the method of step 2 is employed when the motor speed exceeds said predetermined speed.

8. A method as claimed in claim 7, wherein said alternative method of indicating the position of said rotor includes the steps of not applying voltage to one winding, monitoring the back EMF of the unenergized winding and detecting occurrences of a predetermined characteristic of the back EMF waveform.

9. A method as claimed in claim 7, which includes the steps of establishing currents in all said windings when said motor reaches said minimum speed so that said control means begins commutation of power to said windings using said information from said current wave form in each winding.

10. A method as claimed in any one of claims 1 to 9, said method being used to control a motor in a laundry machine, said laundry machine having a washing container, an agitator and a spin tub within said washing container, said agitator being connected so as to be rotated back and forth by said motor and to be rotated with said spin tub when driven continuously in one direction, said motor being an electronically commutated motor having a rotor and a stator with energizable windings and switching devices for connecting each winding to a power supply, which uses a controller to set the state of the switching devices to determine commutation sequences of application of voltage to said stator windings to cause torque-producing current flow in said windings to thereby rotate said rotor.

11. Apparatus for controlling the commutation of power to an electronically commutated motor having a rotor and a stator with energizable windings and switching devices for connecting each winding to a power supply, wherein the state of the switching devices is periodically set to determine commutation sequences of application of voltage to said stator windings to cause torque producing current flow in said stator windings to thereby rotate said rotor, said apparatus comprising: a stored program controller, the output of which controls the state of said switching devices, means for sensing rotor position consisting of current monitoring means which monitors the torque-producing current waveform in at least one of said windings to detect occurrences of a predetermined waveform characteristic, said occurrences being cyclical and indicative of rotor position, means for gating the detected rotor position information to inputs of said controller, the stored program such that after each detected occurrence of said predetermined waveform characteristic the controller uses said information to determine the state said switching devices must attain at the end of a predetermined delay after each detected occurrence to ensure powered rotation of said rotor, and after said predetermined delay the controller places the switching devices in the so determined state.

12. Apparatus according to claim 11, wherein said controller stores a table of sets of allowable switching states and after each detected recurrence of said predetermined waveform characteristic selects from said table a set of switching states which selection is determined by the rotor position information received at the controller inputs at the start of said predetermined delay.

13. Apparatus according to claim 12, including means for encoding the rotor position information, wherein said stored table includes for each stored set of switching states a rotor position code indicative of the position of the rotor immediately prior to the set of switching states required to be implemented for powered rotation of the rotor beyond that rotor position, and wherein said program causes said controller to compare the rotor position code received at the controller inputs with the rotor position codes stored in said table and upon finding a match to select the corresponding set of switching states and to switch the switching devices to that set of states at the end of said predetermined delay.

14. Apparatus according to claim 11, including means for controllably varying said predetermined delay during motor operation, said delay determining the phase relationship between current and voltage in each winding, and the duration of said delay determining the speed of the motor.

15. Apparatus according to claim 11, wherein the characteristic part of the current wave form detected is the waveform zero crossings and said current monitoring means includes a zero-crossing detector.

16. Apparatus according to claim 11, wherein there are current monitoring means for each winding of said motor and the controller receives as inputs the output from each said current monitoring means.

17. Apparatus according to claim 11, including a second means for sensing rotor position and means for assessing the speed of said motor, the output of said second rotor position sensing means also being fed to said gating means, and said speed assessing means controlling said gating means to supply the output of said second rotor position sensing means to said controller when the motor speed is less than a predetermined speed and controlling said gating means to supply the output of the current monitoring means to said controller when the motor speed is greater than said predetermined speed.

18. Apparatus as claimed in claim 17, wherein said stored program causes the controller not to switch voltage to one designated stator winding, wherein said second rotor position sensing means is a voltage monitor which is connected across said designated stator winding to detect occurrences of a predetermined characteristic of the back EMF waveform induced in said designated winding.

19. Apparatus according to claim 11, including controllable pulse width modulating means connected between said power supply and each stator winding which allow the average voltage applied to each winding to be controlled.

20. Apparatus for controlling the commutation of power to said electronically commutated motor as claimed in any one of claims 11 to 19 in combination with a laundry machine having a washing container, an agitator and a spin tub within said washing container, an electric motor, said agitator being connected so as to be rotated back and forth by said motor and to be rotated with said spin tub when driven continuously in one direction, said motor being an electronically commutated motor having a rotor and a stator with energizable windings and switching devices for connecting each winding to a power supply.

* * * * *